Patented May 22, 1951

2,553,682

UNITED STATES PATENT OFFICE 2,553,682

OIL-MODIFIED ALKYD RESIN MODIFIED WITH CELLULOSE DERIVATIVE

Herbert H. Scholz and Arnold M. Taylor, Maplewood, N. J., assignors to Interchemical Corporation, New York, N. Y., a corporation of Ohio No Drawing. Application January 25, 1947, Serial No. 724,466

10 Claims. (Cl. 260—15)

1

This invention relates to an improved process for incorporating cellulose derivatives into oil-modified alkyd resins, especially relatively short oil alkyds, to the resins obtained by such process, and to coating compositions containing these resins.

Since the first use of nitrocellulose lacquers for coating wood or other materials, many improvements have been made in this type of coating composition. Other cellulose derivatives have been extensively used such as ethyl cellulose, benzyl cellulose, methyl cellulose, and cellulose acetate, either alone or preferably with other resinous materials. These cellulose derivatives, when dissolved in suitable volatile solvents, give compositions which dry by solvent release and are commonly referred to as lacquers. When applied to a surface to be coated, these lacquers dry to a hard protective film by evaporation of the solvent.

One of the chief advantages of using the lacquer type of coating composition resides in its rapid drying rate as compared to other types of finishes such as varnishes which dry as a result of the chemical union of oxygen of the air with the non-volatile ingredients of the film. On the other hand, these rapid drying cellulose derivative lacquers possess at least one major disadvantage, namely, they do not have the "film build" which the slower drying varnishes have. Thus to obtain the same depth of film on the surface being coated it is necessary to apply more coats of the lacquer than are required for the varnish. This "film build" is directly related to the total non-volatile ingredients in the composition. Thus, when a composition containing a high percentage of non-volatile film-forming solids such as a varnish is used, fewer coats of the composition are required to produce a finish of the same depth as is produced using a low solids composition such as the best known lacquers.

The best commercial lacquers generally contain from 20 to 30 per cent total non-volatile solids, while the varnishes generally contain 40 per cent total non-volatile solids or higher when ready for use. Heretofore, it has been impractical to make durable lacquers containing higher than about 30 per cent solids. This has been due largely to the low solubility and incompatibility of cellulose derivatives with solvents and other resins. However, it is well recognized that lacquers having a higher solids content would have special merit in the protective and decorative coatings industries. The various objects of the present invention will be apparent as the description of the invention proceeds.

By the prior art processes, it has in general been difficult to incorporate cellulose derivatives into short oil alkyd resin suitable for the formulation of coating compositions. It has long been suspected, however, that the incorporation of cellulose derivatives, such as ethers and esters of cellulose, into short oil alkyds would give a resin which would dry rapidly to a film having very desirable properties. Such films would be expected to be smooth, lustrous and durable. Heretofore, the use of cellulose derivatives in oil-modified alkyd resins has been limited by the poor compatibility of the cellulose derivatives with the alkyds, especially the short oil alkyds. By the use of the term short oil alkyds, we refer to alkyds formed by the reaction of polybasic acids with polyhydric alcohols and modified with up to about 45 per cent by weight of high molecular weight fatty acids such as those present in the form of glycerol esters in vegetable oils.

We have now discovered a novel method for incorporating cellulose derivatives, including ethers and esters of cellulose, into oil-modified alkyd resins to obtain homogeneous products useful for the formulation of coating compositions which dry to smooth, lustrous, and durable films. Briefly stated, our process consists of heating the cellulose derivative with an ester of high molecular weight fatty acids with polyhydric alcohols and reacting the resultant product with polybasic carboxylic acids to form an alkyd resin. By such a process we have been able to obtain homogeneous resins containing up to about 30 per cent by weight of cellulose derivative.

For the purpose of this invention the high molecular weight fatty acids mentioned hereinabove will be referred to as fatty oil acids. These acids may consist of any one of the fatty acids present in natural or synthetic vegetable oils, or to mixtures of such acids. These fatty oil acids may be either saturated or unsaturated. The term cellulose derivative refers to any of the commercially available cellulose derivatives such as the ethers and esters of cellulose. Specific examples of such cellulose derivatives include ethyl cellulose, benzyl cellulose, cellulose acetate and the like.

It is well understood by those skilled in the art that alkyd resins, more specifically, polyhydric alcohol-polybasic carboxylic acid resins, may be produced by heating, to suitable reaction temperatures, mixtures of polybasic carboxylic acids or anhydrides and polyhydric alcohols. Modifying agents such as fatty oil acids or fatty oils themselves, are often included in the reaction mixture. When such acids are used, the modified alkyds obtained are commonly referred to as oil-modified alkyds, and more specifically, as short oil alkyds or long oil alkyds, depending upon the amount of oil modification. There appears to be no definite limitation on the amount of oil or fatty oil acids present in short or long oil alkyds, but, on the other hand, these terms are generally used in a relative sense. Hence, for the purpose of our invention, we have defined a short oil alkyd as an oil-modified alkyd containing up to about 45 per cent by weight of oil modification.

In carrying out the process, we heat a cellulose derivative, such as an ether or ester of cellulose, with an ester of a fatty oil acid and a polyhydric alcohol, which ester must contain unesterified hydroxyl groups. These polyhydric alcohol esters, containing unesterified hydroxyl groups, will hereinafter be referred to as partial esters, and such designation is intended to include not only the partial esters of polyhydric alcohols, e. g. the fatty oil acid monoglycerides, but also the completely esterified polyhydric alcohol esters such as triglycerides, which contain unesterified hydroxyl groups in the fatty acids groups, e. g. castor oil.

Furthermore, in carrying out our invention we prefer to react these partial esters with the cellulose derivatives in the presence of unesterified polyhydric alcohol, but it should be understood that such procedure is only preferred and not essential, for instance, when mixtures of ethyl cellulose and castor oil are heated to 375 to 450° F. a compatible product is obtained which may be reacted with polyhydric alcohol and polybasic acid to form the desired alkyd. The amount of unesterified polyhydric alcohol present in the reaction mixture may be any amount up to the amount necessary to form the desired alkyl-cellulose derivative resin. Since we have already limited our invention to the incorporation of cellulose derivatives into short oil alkyds, i. e. alkyds containing up to 45 per cent of oil modification, we have, in effect, set an upper limit on the amount of polyhydric alcohol that may be used. Such limit would of course be the amount of polyhydric alcohol necessary to form an oil-modified alkyd containing not more than 45 per cent of oil modification. Also, it is obvious that this upper limit of polyhydric alcohol may vary inversely with the percentage of oil modification desired in the resin.

A preferred method of forming the partial esters used in our invention is to react a triglyceride oil with an amount of polyhydric alcohol at least sufficient to form mono-esters of the polyhydric alcohol but preferably the amount of polyhydric alcohol should be substantially all the polyhydric alcohol required to form the alkyd resin. Also, due to the high temperatures involved in forming the partial esters, some polyhydric alcohol will be lost and this must also be taken into consideration in determining the amount of polyhydric alcohol to use. The reaction between a triglyceride and a polyhydric alcohol is an alcoholysis-type reaction and generally an alkaline-type catalyst such as calcium oxide or litharge is used to promote the reaction.

It has already been mentioned that esters containing unesterified hydroxyl groups may also be obtained by using fatty oil esters which contain free hydroxyl groups in the fatty acid radicals. Such esters, however, will not generally be preferred unless they are commercially available as is the case with castor oil. Castor oil is a triglyceride of fatty oil acid which contains free hydroxyl groups in the fatty acid radical and we do not have to form the partial ester of this substance before it is heated with the cellulose derivative and polyhydric alcohol.

The esters employed in the process of our invention are preferably the esters of glycerol, or mixtures of glycerol with other polyhydric alcohols such as pentaerythritol, ethylene glycol, sorbitol or mannitol. The use of glycerol esters is preferred chiefly because glycerol is more readily available and more economical to use than other polyhydric alcohols. It should be understood, however, that all polyhydric alcohols commonly employed for making alkyd resins may be employed in the process of our invention.

The fatty oil acid portion of the partial esters used in the process of our invention may be any of the fatty oil acids occurring in natural or synthetic vegetable oils, such as castor oil, dehydrated castor oil, linseed oil, perilla oil and soya oil. In this connection, it has already been pointed out that when we use castor oil in the process of our invention we do not need to form the partial esters of the acids present in the castor oil but may heat the cellulose derivative and polyhydric alcohol with the castor oil directly.

As already stated hereinabove, the cellulose derivative which is heated with the ester may be any of the commercially available cellulose derivatives such as the ethers and esters of cellulose including, for example, cellulose acetate, cellulose nitrate, cellulose acetopropionate, cellulose acetobutyrate, ethyl cellulose, methyl cellulose, and benzyl cellulose. The cellulose derivative is preferably heated with the ester at a temperature of 375 to 450° F. until a homogeneous product is obtained. The upper temperature limit will necessarily depend upon the decomposition temperature of the cellulose derivative used. The time of heating which is required to give a homogeneous product will depend, for the most part, upon the particular cellulose derivative used and on the temperature, generally the time of heating required for the preferred temperature range will be 2 to 20 minutes.

Although the present invention may be practiced with practically any cellulose derivative, we prefer to avoid the use of celluose nitrate due to the generally hazardous nature of this substance.

The homogeneous product obtained by heating the cellulose derivative with an esterification product of a fatty acid with a polyhydric alcohol is converted to an alkyd resin by reaction with a polybasic acid. Polybasic acid as used herein refers to polybasic carboxylic acids or their anhydrides. Any of the polybasic acids or anhydrides which are commonly used to prepare alkyds may be used, such as phthalic anhydride, maleic anhydride, and fumaric acid. The alkyd is preferably formed by cooking the reactants at a temperature above about 375° F. but below about 420° F. until reaction is complete or until an alkyd resin having the desired acid number is obtained.

It is obvious that the particular manner in which the alkyd-cellulose derivative resin is cooked may vary considerably. For instance, we may cook the product formed by heating the cellulose derivative with the ester, with one or more polybasic acids or their anhydrides or mixtures of these. We may also add further quantities of polyhydric alcohols, such as pentaerythritol, mannitol or glycerol at any stage during the cooking of the alkyd. Small quantities of pentaerythritol are advantageously added towards the end of the cook to speed up the reaction. Small quantities of maleic anhydride added to the mixture also tend to speed up the reaction. In general, however, we prefer not to form the alkyd from maleic anhydride as the only polybasic acid because the reaction is too rapid and is thus too difficult to control.

The preferred procedure for cooking the alkyd resin consists in heating the reaction product of cellulose derivatives and polyhydric alcohol ester to the desired reaction temperature and then adding the polybasic acids in portions to the mixture, heating being continued after the addition of each portion until the reaction has subsided and compatibility obtained. Such a procedure permits a better control over the reaction and the properties of the alkyd resin. As a typical example, the product formed by heating the partial ester of linseed oil fatty acids with ethyl cellulose is heated to the desired temperature for forming the alkyd resin, then a relatively small amount of fumaric acid is added and heating continued until reaction is substantially completed as indicated by the formation of a clear reaction mixture. Then a portion of phthalic anhydride is added and heating continued until this is reacted. Then another polybasic acid is added such as maleic anhydride and heating continued until this has reacted. Finally, additional quantities of phthalic anhydride and/or other polybasic carboxylic acids may be added to obtain an alkyd resin of the desired characteristics. Though this preferred procedure will appear to be rather complex, those experienced in the art of cooking alkyd resins will recognize that the procedure is, in general, a standard practice in this field.

By the procedure outlined above and particularly exemplified in the examples, it is possible to prepare homogeneous oil-modified alkyd-cellulose derivative resins containing up to about 30 per cent cellulose derivative, based upon the assumption that all of the cellulose derivative remains in the product during the cooking of the resin. Thus, if the cellulose derivative amounted to 20 per cent of the total weight of reactants used in making the resin and the actual yield of resin was 90 per cent based on total reactants, we would have a product containing 22.2 per cent of cellulose derivative.

The chemical composition of our novel alkyd-cellulose derivative resin will, of course, depend upon the ratios in which the ingredients are reacted. Thus, by incorporating up to 30 per cent of cellulose derivative into short oil alkyds, i. e. alkyds containing up to 45 per cent of fatty oil modification, we obtain alkyd-cellulose derivative resins containing up to about 32 per cent of oil modification. Resins containing less than 30 per cent cellulose derivative can contain even higher percentages of oil modification, however, we prefer not to increase the oil modification of the alkyd-cellulose derivative resin beyond about 40 per cent. It will be noted from the examples that the total amount of polyhydric alcohol used is generally in excess of the amount required to esterify all the carboxyl groups present. In most cases, this excess amounts to as high as 50 per cent. Such an excess of polyhydric alcohol is preferred but not at all critical. It will be obvious to those skilled in the art that alkyd resins may be cooked from any desired ratio of polycarboxylic acid and polyhydric alcohol and that properties of the alkyd may vary depending upon whether or not the polybasic acid or polyhydric alcohol is in excess and also upon the extent to which the two have been reacted. For instance, in the present invention we use more than enough polyhydric alcohol to esterify all the polybasic acid but since the final product still may have an acid number up to about 40, we have not esterified all of the carboxyl groups. The alkyds formed by our process having an acid number below about 40 are found to be the most useful for our present purpose, namely, for use in the wood finishing compositions.

The preparation of the alkyd-cellulose derivative resins of our invention may also be carried out by reacting the various reactants with each other in suitable solvents. This procedure will be limited, of course, by the solubility of the reactants and products in the solvents as well as by the boiling point of the solvent. It is obvious that low boiling solvents would not be suitable. We have successfully carried out the process in such solvents as Solvesso #3 (high boiling solvent containing principally aromatics), and diisobutyl ketone, and mixtures of such solvents.

The following examples, in which the parts are by weight, are given to further illustrate the manner in which our invention may be carried out.

*Example I*

A partial ester of castor oil fatty acids and glycerol was formed by alcoholysis, in known manner, of 450 parts of castor oil (20.4%) with 520 parts of glycerol (23.5%). A mixture of phosphoric acid and p-toluene sulfonic acid was used as catalyst. To this partial ester, heated to about 430° F., was added 404 parts (18.2%) of ethyl cellulose (Dow's Ethocel, std. 22 cps. grade) and the mixture was heated at 410 to 420° F. until a homogeneous product was obtained, as determined by the formation of a clear drop on a tin panel. This ethyl cellulose-partial ester product was then cooked with 830 parts (37.9%) of phthalic anhydride at about 410–420° F. until an alkyd resin of acid number 30 was obtained. Total reaction time for the preparation of the partial ester, the ethyl cellulose-partial ester product, and the alkyd was about 5 hours. The alkyd contained about 18.3 per cent by weight of ethyl cellulose.

*Example II*

To a mixture of 300 parts (20.8%) of castor oil and 346 parts (24.0%) of glycerol was added 268 parts (18.6%) of ethyl cellulose (Dow's Ethocel std. 22 cps. type) and then the mixture was heated at 410–420° C. until a homogeneous product was obtained. This homogeneous product was then reacted with 21.6 parts (1.5%) of fumaric acid, 470 parts (32.6%) of phthalic anhydride, and 36.6 parts (2.5%) of maleic anhydride to form an alkyd. The reaction to form the alkyd was carried out at about 440° F. The procedure consisted in heating the ethyl cellulose-partial ester reaction product to the desired reaction temperature and then, while maintaining the mixture at the desired temperature, adding the polybasic acids in the following order: fumaric acid, one-half the phthalic anhydride, one-half the maleic anhydride, second half of the phthalic anhydride and second half of the maleic anhydride. After each addition, the mixture was heated for a while, or until the mixture cleared up and foaming had substantially subsided, then the next portion of acid was added. The total cooking time was about 4.5 hours. The resin obtained had an acid number of about 26.

Procedures similar to that of Example I were used in the following examples.

*Example III*

| | Percentage by weight |
|---|---|
| Soya oil | 20.70 |
| Glycerol | 23.30 |
| Litharge | .02 |
| Ethocel, std. 22 cps. type | 18.60 |
| Fumaric acid | 1.50 |
| Phthalic anhydride | 32.63 |
| Maleic anhydride | 2.53 |
| Pentaerythritol | .72 |

The total cooking time to obtain an alkyd of acid number 36, and ethyl cellulose content of 21 per cent was about 4 hours. The yield of resin was about 88.6 per cent based on total reactants used.

*Example IV*

| | Percentage by weight |
|---|---|
| Linseed oil | 20.70 |
| Glycerol | 23.30 |
| Calcium hydroxide | .02 |
| Ethocel, std. 22 cps. type | 18.60 |
| Fumaric acid | 1.50 |
| Phthalic anhydride | 32.63 |
| Maleic anhydride | 2.53 |
| Pentaerythritol | .72 |

The total cooking time to obtain an alkyd of acid number 20.3 was 7 hours, 45 minutes. The yield was 89 per cent.

*Example V*

| | Percentage by weight |
|---|---|
| Soya oil | } 20.70 |
| China-wood oil | |
| Glycerol | 24.00 |
| Litharge | .02 |
| Ethocel, std. 22 cps. type | 18.60 |
| Fumaric acid | 1.50 |
| Phthalic anhydride | 32.65 |
| Maleic anhydride | 2.53 |

Total cooking time to obtain an alkyd of acid number 40 was 4 hours, and 20 minutes. The yield was 85 per cent.

*Example VI*

| | Percentage by weight |
|---|---|
| Soya oil | 21.00 |
| China-wood oil | 2.33 |
| Glycerol | 26.90 |
| Litharge | .02 |
| Ethocel, std. 22 cps. type | 8.65 |
| Fumaric acid | 1.68 |
| Phthalic anhydride | 36.57 |
| Maleic anhydride | 2.85 |

Total cooking time to obtain an alkyd of acid number 30 was 3 hours, 30 minutes.

*Example VII*

| | Percentage by weight |
|---|---|
| Soya oil | 30.00 |
| China-wood oil | 3.40 |
| Glycerol | 24.50 |
| Litharge | .04 |
| Ethocel, std. 22 cps. type | 4.70 |
| Fumaric acid | 1.53 |
| Phthalic anhydride | 33.24 |
| Maleic anhydride | 2.59 |

Total cooking time to obtain an alkyd of acid number 29.6 was 2 hours, 45 minutes. The yield was 88.4 per cent.

*Example VIII*

| | Percentage by weight |
|---|---|
| Linseed oil | 18.57 |
| China-wood oil | 2.06 |
| Glycerol | 23.80 |
| Calcium hydroxide | .02 |
| Ethocel, std. 22 cps. type | 18.50 |
| Phthalic anhydride | 32.34 |
| Maleic anhydride | 3.99 |
| Pentaerythritol | .72 |

Total cooking time to obtain an alkyd of acid number 43 was 6 hours.

*Example IX*

| | Percentage by weight |
|---|---|
| Castor oil | 20.60 |
| Glycerol | 23.80 |
| Litharge | .02 |
| Methyl cellulose (Methocel) | 18.50 |
| Fumaric acid | 1.49 |
| Phthalic anhydride | 32.36 |
| Maleic anhydride | 2.52 |
| Pentaerythritol | .71 |

Total tooking time to obtain an alkyd of acid number 26.9 was 5 hours, 30 minutes. The yield was 87.6 per cent and the product contained about 21 per cent methyl cellulose.

*Example X*

| | Percentage by weight |
|---|---|
| Castor oil | 20.60 |
| Glycerol | 23.80 |
| Litharge | .02 |
| Cellulose acetobutyrate (Hercose CN) | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 21.8 was 6 hours. The yield was 88.4 per cent.

*Example XI*

| | Percentage by weight |
|---|---|
| Castor oil | 20.60 |
| Glycerol | 23.80 |
| Litharge | .02 |
| Cellulose acetopropionate (Hercose AP) | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 18 was 5 hours, 20 minutes. The yield was 87.6 per cent and the product contained about 21 per cent cellulose acetopropionate.

*Example XII*

| | Percentage by weight |
|---|---|
| Soya oil | 20.60 |
| Glycerol | 23.80 |
| Litharge | .02 |
| Cellulose acetopropionate (Hercose AP) | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 27 was 7 hours.

Example XIII

| | Percentage by weight |
|---|---|
| Linseed oil | 20.60 |
| Glycerol | 23.80 |
| Litharge | .02 |
| Cellulose Acetopropionate (Hercose AP) | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 28 was 5 hours.

Example XIV

| | Percentage by weight |
|---|---|
| Castor oil | 20.75 |
| Glycerol | 24.00 |
| Litharge | .02 |
| Benzyl cellulose | 18.52 |
| Fumaric acid | 1.48 |
| Phthalic anhydride | 32.69 |
| Maleic anhydride | 2.54 |

Total cooking time and acid number were not accurately observed in this example.

Example XV

| | Percentage by weight |
|---|---|
| Soya oil | 20.60 |
| Glycerol | 23.80 |
| Litharge | .02 |
| Cellulose acetate | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 38.6 was 3 hours, 45 minutes.

Example XVI

| | Percentage by weight |
|---|---|
| Perilla oil | 20.60 |
| Glycerol | 23.80 |
| Litharge | .02 |
| Cellulose acetopropionate (Hercose AP) | 18.50 |
| Fumaric acid | 1.49 |
| Phthalic anhydride | 32.36 |
| Maleic anhydride | 2.52 |
| Pentaerythritol | .71 |

Total cooking time to obtain an alkyd of acid number 40.4 was 3 hours, 15 minutes.

Example XVII

| | Percentage by weight |
|---|---|
| Castor oil | 10.40 |
| Dehydrated castor oil | 10.40 |
| Glycerol | 21.60 |
| Litharge | .02 |
| Cellulose acetopropionate (Hercose AP) | 18.65 |
| Fumaric acid | 1.50 |
| Phthalic anhydride | 34.89 |
| Maleic anhydride | 2.54 |

Total cooking time to obtain an alkyd of acid number 53.7 was 3 hours, 15 minutes.

Example XVIII

| | Percentage by weight |
|---|---|
| Soya oil | 28.80 |
| China-wood oil | 3.20 |
| Glycerol | 18.95 |
| Litharge | .03 |
| Ethyl cellulose (Hercules N-50 grade) | 8.80 |
| Fumaric acid | 1.47 |
| Phthalic anhydride | 31.75 |
| Maleic anhydride | 2.48 |
| Glycerol (at end of cook) | 4.52 |

Total cooking time to obtain an alkyd of acid number 30 was 3 hours, 30 minutes.

Example XIX

| | Percentage by weight |
|---|---|
| Soya oil | 28.80 |
| China-wood oil | 3.20 |
| Glycerol | 18.95 |
| Litharge | .03 |
| Menthyl phenol (stabilizer) | .36 |
| Ethyl cellulose (Hercules N-50 grade) | 8.80 |
| Phthalic anhydride | 31.62 |
| Maleic anhydride | 3.72 |
| Glycerol (at end of cook) | 4.52 |

The menthyl phenol stabilizer was added to the reaction after the partial ester had been formed. Total cooking time to obtain an alkyd of acid number 28.4 was 3 hours, 30 minutes.

Example XX

| | Percentage by weight |
|---|---|
| Soya oil | 18.70 |
| China-wood oil | 2.75 |
| Ethylene glycol | 19.40 |
| Litharge | .02 |
| Fumaric acid (to precipitate catalyst) | .92 |
| Ethyl cellulose (Ethocel, std. 22 cps. type) | 18.60 |
| Fumaric acid | 1.32 |
| Phthalic anhydride | 31.13 |
| Maleic anhydride | 2.54 |
| Ethlyene glycol (at end of cook) | 4.62 |

Total cooking time was 5 hours, 15 minutes. In the procedure of this example, the first portion of fumaric acid (2 parts) was added to precipitate the catalyst used in forming the partial esters. Although this modification is not necessary for the purposes of our invention, it may be used in all the above examples if it is desired to precipitate the catalyst before reacting the partial esters with the cellulose derivatives.

Example XXI

| | Percentage by weight |
|---|---|
| Fish oil (Falkovar K, Heavy) | 24.10 |
| Oiticica oil | 8.05 |
| Glycerol | 23.00 |
| Litharge | .02 |
| Ethyl cellulose, Hercules N-50 | 8.82 |
| Fumaric acid | 1.47 |
| Maleic anhydride | 2.49 |
| Phthalic anhydride | 32.05 |

Total cooking time to obtain an amber colored resin of acid number 38 was 4 hours, and 20 minutes.

Example XXII

| | Percentage by weight |
|---|---|
| Castor oil | 20.60 |
| Glycerol | 23.80 |
| Cellulose acetopropionate (Hercose AP) | 18.50 |
| Fumaric acid | 1.49 |
| Phthalic anhydride | 32.38 |
| Maleic anhydride | 2.52 |
| Pentaerythritol | .71 |

This alkyd was cooked exactly as the alkyd of Example XI except that the partial ester of glycerol and castor oil was not prepared by the action of a catalyst before adding the cellulose acetopropionate. Total cooking time to obtain an alkyd of acid number 36 was 5 hours.

Example XXIII

| | Percentage by weight |
|---|---|
| Castor oil | 18.85 |
| Glycerol | 21.80 |
| Cellulose acetopropionate (Hercose AP) | 25.40 |
| Fumaric acid | 1.36 |
| Phthalic anhydride | 29.64 |
| Maleic anhydride | 2.30 |
| Pentaerythritol | .65 |

The procedure for cooking this alkyd was similar to that of Example XXII. Total cooking time to obtain an alkyd of acid number 37 was 2 hours, 50 minutes. The alkyd contained about 29.2 per cent cellulose acetopropionate.

For the preparation of the coating composition of the present invention, we dissolve one of the alkyd-cellulose derivative resins in a suitable volatile solvent, such as aromatic hydrocarbon, aliphatic alcohols, esters, ketones or the like, or mixtures of these solvents, or mixtures of any one or more of these solvents with aliphatic hydrocarbons, in a proportion to give a consistency suitable for application as by spraying, dipping or brushing, to the surface to be coated. We prefer to use the alkyd-cellulose derivative resin in conjunction with other non-volatile film-forming constituents, especially uncured melamine or urea aldehyde resins, or cellulose nitrate. Also, additional non-curing resins such as modified phenolic resins, and maleic anhydride resins, commonly referred to as hard resins, may be used. When the uncured resins are used with the alkyd cellulose derivative resin to prepare an air drying composition, we use an acid-type catalyst that is capable of converting the uncured resin to a cured resin at ordinary room or factory temperatures. Typical catalysts that have been found to be operable include para-toluene sulphonic acid, hydroxylamine hydrochloride, ethyl phosphoric acid, butyl phosphoric acid, and 2,5-dichlorobenzene sulphonic acid. These catalysts are preferably added to the composition just before it is to be used.

Where the alkyd cellulose derivative resin is used with uncured resin to obtain a coating composition to be cured by baking it will be unnecessary to add catalysts, however, even in this case it is desirable to add small amounts of catalysts to facilitate curing the finish at a lower temperature than would be required without catalysts. Practical curing times and temperatures may thus be regulated by controlling the amount of catalyst added.

In preparing the coating composition containing alkyd-cellulose derivative resin together with an uncured melamine or urea resin, we prefer to use the two resins in the ratio of about 1 to 2 parts by weight of alkyd-cellulose derivative resin to 1 part of the uncured resin. Uncured melamine and urea resin as used herein refers to the organic solvent soluble reaction product of an aliphatic carbonyl compound such as formaldehyde with urea or melamine, or with the alkyl derivatives of these, and which product is capable of further reaction either by heat or under the influence of catalysts to give a cured resin of the thermoset type. For use in compositions which are to be cured by baking, it may be unnecessary to add a catalyst. Also, proportionately smaller amounts of catalyst are needed as the temperature of curing is increased.

As is common practice in the decorative and protective coatings industries, other modifying agents may be added to the composition, such as plasticizers, flatting agents and the like.

Coating compositions prepared in the above-described manner may be made to contain 40 per cent or higher of non-volatile film-forming ingredients at spraying consistency. These compositions contain sufficient cellulose ester or ether, presumably in chemically combined form, to impart luster, smoothness and durability to the cured films produced from such composition. On the other hand, the compositions have a sufficiently high solids content to give film depths equivalent to the varnishes, but still possess the rapid drying qualities of low solids lacquers. Such compositions, so far as is known, are novel to the coatings industries.

The following examples, in which the parts are by weight, further illustrate the invention.

Example XXIV

| | Percentage by weight |
|---|---|
| Soya oil | 29.30 |
| Tung oil | 3.30 |
| Glycerol | 23.25 |
| Litharge | .03 |
| Ethyl cellulose (Ethocel, std. 22 cps. type) | 8.75 |
| Maleic anhydride | 2.44 |
| Fumaric acid | 1.43 |
| Phthalic anhydride | 31.50 |

An alkyd-cellulose derivative resin having an acid number of 34.4 was prepared from the above amounts of reactants by a procedure similar to that used in Example I. An air-drying coating composition for wood was formulated as follows:

| | Parts by weight |
|---|---|
| Alkyd-cellulose derivative resin | 21.70 |
| Urea-formaldehyde resin (Beetle 251-8) | 23.67 |
| Phenol-formaldehyde hard resin (Amberol K-12-A) | 4.65 |
| Catalyst (equal parts n-butyl phosphoric acid, hydroxylamine hydrochloride, and p-toluene sulphonic acid) | 0.67 |
| Xylol | 30.37 |
| VM & P Naphtha (aliphatic hydrocarbon solvent of boiling range 140–166° C.) | 14.67 |
| n-Butyl alcohol | 1.61 |
| Methyl cellosolve (methylether of ethylene glycol) | 2.66 |

The Beetle 251-8 resin used in the above formulation is described by the supplier as a 55 per cent solution of an unmodified butylated urea-formaldehyde resin in a mixture of 2 parts butanol and 1 part xylol. Amberol K-12-A is described by the supplier as a modified phenol-formaldehyde hard resin. The catalyst employed in this composition, as well as in the compositions disclosed in the other examples, is added preferably as a solution in one of the solvents shortly before the composition is to be used.

The above composition has a total solids content of about 39 per cent excluding catalyst. It can be sprayed on wood to give a rapid drying coating which has durability, hardness, and other qualities equivalent to or better than the best known commercial lacquers. Furthermore, one coat of the composition is approximately equivalent to two coats of a lacquer of the commonly used type containing 20 per cent solids

Example XXV

| | Parts by weight |
|---|---|
| Alkyd-cellulose derivative resin of Example XI | 23.43 |
| Urea-formaldehyde resin (Uformite F-200-E) | 24.70 |
| Phenol-formaldehyde hard resin (same as in Example XXIV) | 3.98 |
| Catalyst (2 parts n-butyl phosphoric acid to 1 part hydroxylamine hydrochloride) | .62 |
| Xylol | 22.67 |
| Methyl alcohol | 2.46 |
| n-Butyl alcohol | 13.52 |
| Hexone (methyl isobutyl ketone) | 8.62 |
| | 100.00 |

The Uformite F-200-E resin used in the above composition is described by the supplier as a 50 per cent solution of urea-formaldehyde resin in a mixture of butanol and xylol.

Films produced from the above composition dry rapidly in air to a hard tough film having good adhesion to wood. Since the composition contains about 42 per cent of non-volatile film-forming ingredients, one coat of the composition is equivalent in film build to two coats of a conventional type lacquer containing 21 per cent non-volatile film-forming solids.

Example XXVI

| | Parts by weight |
|---|---|
| Alkyd-cellulose derivative resin of Example XIII | 19.81 |
| Urea-formaldehyde resin (Beetle 227-8) | 31.72 |
| Maleic anhydride hard resin (Amberol 801-P) | 3.96 |
| Catalyst (n-butyl phosphoric acid) | 0.79 |
| Toluene | 5.10 |
| Xylol | 4.84 |
| n-Butyl alcohol | 4.16 |
| Methyl ethyl ketone | 3.56 |
| Diacetone alcohol | 0.51 |
| Hexone (methyl isobutyl ketone) | 8.81 |
| Ethyl acetate | 5.10 |
| Butyl acetate | 3.68 |
| Ethyl alcohol | 2.19 |
| Cellosolve (ethyl ether of ethylene glycol) | 3.65 |
| Butyl cellosolve (butyl ether of ethylene glycol) | 2.12 |
| | 100.00 |

The Beetle 227-8 resin used in the above composition is described by the supplier as a 50 per cent solution of urea-formaldehyde resin in 30 parts butanol and 20 parts of xylol. The Amberol 801-P resin is described by the supplier as a rosin-modified maleic anhydride resin.

Example XXVII

An air-drying composition containing the resin was formulated as follows:

| | Parts by weight |
|---|---|
| Alkyd-cellulose derivative resin of Example XXI | 21.49 |
| Urea-formaldehyde resin (Beetle 251-8) | 23.60 |
| Phenol-formaldehyde hard resin (Amberol K-12-A) | 4.60 |
| Catalyst (same as in Example XXIV) | 0.64 |
| Xylol | 36.34 |
| VM & P Naphtha (aliphatic hydrocarbon of boiling range 140-166° C.) | 4.61 |
| n-Butyl alcohol | 4.61 |
| Sec. Butyl alcohol | 1.53 |
| Methyl cellosolve (methyl ether of ethylene glycol) | 2.58 |
| | 100.00 |

Example XXVIII

Using the same alkyd-cellulose derivative resin of Example XXI a low bake wood finishing composition was formulated as follows:

| | Parts by weight |
|---|---|
| Alkyd cellulose derivative resin of Example XXI | 20.44 |
| Urea-formaldehyde resin (Beetle 251-8) | 22.40 |
| Phenol-formaldehyde resin (Amberol K-12-A) | 4.37 |
| Catalyst (same as in Example XXIV) | 0.61 |
| Xylol | 29.29 |
| VM & P Naphtha (Aliphatic hydrocarbon solvent of boiling range 140-166° C.) | 9.94 |
| Methyl alcohol | 2.45 |
| n-Butyl alcohol | 8.75 |
| Hexone (methyl isobutyl ketone) | 1.75 |
| | 100.00 |

This composition contains about 37 per cent solids excluding catalyst and can be baked to a hard tough film by baking for about one and one-half hours at 112° F.

Example XXIX

| | Parts by weight |
|---|---|
| Alkyd-cellulose derivative resin of Example III | 10.00 |
| Cellulose nitrate (¼ sec. type containing 35 per cent ethanol) | 15.39 |
| Methyl ethyl ketone | 4.45 |
| Ethyl acetate | 6.66 |
| Butyl acetate | 16.65 |
| Solvesso #3 (aromatic solvent, boiling range 180-210° C.) | 15.44 |
| Xylol | 28.80 |
| Hexone (methyl isobutyl ketone) | 1.05 |
| Toluol | 1.56 |
| | 100.00 |

This composition contained about 20 per cent total solids and had a Gardner-Holt viscosity of A. It could be sprayed to give a very hard and tough film which could be sanded after drying for about 2-3 hours at room temperature.

Example XXX

| | Parts by weight |
|---|---|
| Alkyd-cellulose derivative resin of Example XI | 23.40 |
| Melamine-formaldehyde resin (Uformite MM-55) | 24.63 |
| Phenol-formaldehyde hard resin (Amberol K-12-A) | 4.00 |
| n-Butyl alcohol | 19.12 |
| Xylol | 14.08 |
| Hexone (methyl isobutyl ketone) | 8.60 |
| Methyl alcohol | 4.94 |
| Catalyst (2 parts n-butyl phosphoric acid to 1 part hydroxylamine hydrochloride) | 1.23 |
| | 100.00 |

The Uformite MM-55 resin used in the above formulation is described by the supplier as a 50 per cent solution of an unmodified melamine-formaldehyde resin in n-butyl alcohol and xylol.

The above composition has a total solids content of about 40 per cent exclusive of catalyst. Films formed from the composition dried in air to a very slight tack in about one and one-half hours.

As in the conventional practice, in the wood finishing industries, we may apply our novel coating compositions to wood surfaces that previously have been prepared for the final finish coat. Conventional treatments of wood surfaces before applying the final lacquer coat include staining, glazing filling, sealing, and sanding. We apply a coating of our composition or finish to the properly prepared wood surface, preferably by spraying, and after drying the surface may be sanded and a second coat of the finish applied, if desired. The top coat of finish, may, after drying, be rubbed and polished in conventional manner. Since it is generally unnecessary to apply more than two coats of our finish, the overall process time of finishing the wood surface can be reduced considerably.

The finishing schedule employing our novel compositions may be adjusted to meet the needs of the manufacturer. For example, for a baking finishing schedule, the composition may be adjusted by using a decreasing amount of catalyst as the temperature of baking is increased.

For a fast air-drying schedule, the coating composition may be reduced to a non-volatile solids content of approximately 30–35 per cent and applied in the same manner as a sealer coat. After drying in air for about two hours, the film can be dry sanded and a second coat of the full-bodied composition, i. e. a composition containing about 40 per cent solids, can be applied by spraying. After drying over night, the finish is ready for rubbing and polishing.

By adding suitable flattening agents to our finish composition, we can use the finish to produce a flat effect which simulates a rubbed effect obtained normally by rubbing with an abrasive pigment and a mineral oil. Suitable flatting agents may be inorganic or organic flatting agents such as dehydrated silica gel or a completely cured urea-formaldehyde type resin.

Many different embodiments of the invention are possible without departing from the valid scope of the invention as defined in the appended claims.

We claim:

1. A process for preparing a modified alkyd resin from the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said process comprising (a) heating said cellulose derivative with an ester of the fatty oil acid and polyhydric alcohol, which ester contains unesterified alcoholic hydroxyl groups, said heating being continued at 375° to 450° F. until a homogeneous reaction product is obtained, and (b) then esterifying the homogeneous product with the dicarboxylic acid; and wherein the said reactants are reacted in such proportions that the fatty oil acid, calculated as its triester of glycerol, corresponds to 18.85% to 33.40% of said triester in the starting material, and the cellulose derivative constitutes 4.70% to 25.40% of the starting material.

2. A process for preparing a modified alkyd resin from the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said process comprising (a) heating said cellulose derivative with a partial ester of the fatty oil acid and polyhydric alcohol, in the presence of unesterified polyhydric alcohol, said heating being continued at 375° to 450° F. until a homogeneous reaction product is obtained, and then (b) esterifying the homogeneous reaction product with the dicarboxylic acid; and wherein the said reactants are reacted in such proportions that the fatty oil acid, calculated as its triester of glycerol, corresponds to 18.85% to 33.40% of said triester in the starting material, and the cellulose derivative constitutes 4.70 to 25.40% of the starting materials.

3. A process for preparing a modified alkyd resin from the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said process comprising (a) heating said cellulose derivative with a partial ester of the fatty oil acid and polyhydric alcohol, said heating being continued at 375° to 450° F. until a homogeneous reaction product is obtained and then (b) esterifying the homogeneous product and a portion of the unreacted polyhydric alcohol with the dicarboxylic acid; and wherein the said reactants are reacted in such proportions that the fatty oil acid, calculated as its triester of glycerol, corresponds to 18.85% to 33.40% of said triester in the starting material, and the cellulose derivative constitutes 4.70 to 25.40% of the starting materials.

4. A modified alkyd resin consisting of the reaction product of the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said resin being obtained by the process comprising (a) heating said cellulose derivative with a partial ester of the fatty oil acid and polyhydric alcohol, which ester contains unesterified alcoholic hydroxyl groups, said heating being continued at 375° to 450° F. until a homogeneous reaction product is obtained, and (b) then esterifying the homogeneous product with the dicarboxylic acid; and wherein the said reactants are reacted in such proportions that the fatty oil acid, calculated as its triester of glycerol, corresponds to 18.85% to 33.40% of said triester in the starting material, and the cellulose derivative constitutes 4.70 to 25.40% of the starting materials.

5. A resin as in claim 4 in which the ester containing unesterified hydroxyl groups is castor oil.

6. A resin as in claim 4 in which the partial ester is the monoglyceride of linseed oil fatty acids.

7. A resin as in claim 4 in which the partial ester is the monoglyceride of castor oil fatty acids.

8. A coating composition comprising a volatile and non-volatile vehicle components, the non-volatile vehicle comprising a modified alkyd resin consisting of the reaction product of the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said resin being obtained by the process comprising (a) heating said cellulose derivative with an ester of the fatty oil acid and polyhydric alcohol, which ester contains unesterified alcoholic hydroxyl groups, said heating being continued at 375° to 450° F. until a homogeneous reaction product is obtained, and (b) then esterifying the homogeneous product with the dicarboxylic acid; and wherein the said reactants are reacted in such proportions that the fatty oil acid, calculated as its triester of glycerol, corresponds to 18.85 to 33.40% of said triester in the starting material, and the cellulose derivative constitutes 4.7 to 25.4% of the starting material.

9. A coating composition comprising volatile and non-volatile vehicle components, the non-volatile vehicle comprising an uncured thermosetting resin of the class consisting of uncured urea-aldehyde resin and uncured melamine-aldehyde resin and a modified alkyd resin consisting of the reaction product of the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said alkyd resin being obtained by the process comprising (a) heating the said cellulose derivative with the partial ester of the fatty oil acid and polyhydric alcohol in the presence of unesterified polyhydric alcohol, said heating being continued at 375° to 450° F. until a homogeneous reaction product is obtained, and (b) then esterifying the homogeneous product with the dicarboxylic acid; and wherein the said reactants are reacted in such proportions that the fatty oil acid, calculated as its triester of glycerol, corresponds to 18.85 to 33.40% of said triester in the starting material, and the cellulose derivative constitutes 4.7 to 25.4% of the starting material.

10. An air-drying coating composition comprising volatile and non-volatile vehicle components, the non-volatile vehicle of which comprises an uncured thermosetting resin of the class consisting of uncured urea-aldehyde resin and uncured melamine-aldehyde resin, a catalyst capable of converting the uncured resin to cured resin at room temperature, and a modified alkyd resin consisting of the reaction product of the following reactants: (1) fatty oil acid, (2) polyhydric alcohol containing 2 to 6 hydroxyl groups, (3) a cellulose derivative of the class consisting of film-forming, organic solvent soluble cellulose ethers and esters said ethers and esters containing free cellulose hydroxyls as the only free hydroxyls, and (4) dicarboxylic acid, said alkyd resin being obtained by the process comprising (a) heating the said cellulose derivative with the partial ester of the fatty oil acid and polyhydric alcohol in the presence of unesterified polyhydric alcohol, said heating being continued at 375° to 450° F. until a homogeneous reaction product is obtained, and (b) then esterifying the homogeneous product with the dicarboxylic acid; and wherein the said reactants are reacted in such proportions that the fatty oil acid, calculated as its triester of glycerol, corresponds to 18.85 to 33.40% of said triester in the starting material, and the cellulose derivative constitutes 4.7 to 25.4% of the starting material.

HERBERT H. SCHOLZ.
ARNOLD M. TAYLOR.

REFERENCES CITED

The following references are of record in the file of this patent:

UNITED STATES PATENTS

| Number | Name | Date |
|---|---|---|
| 1,108,329 | Callahan | Aug. 25, 1914 |
| 2,022,011 | Sly | Nov. 26, 1935 |
| 2,218,474 | Moore | Oct. 15, 1940 |

FOREIGN PATENTS

| Number | Country | Date |
|---|---|---|
| 610,556 | Germany | Mar. 12, 1935 |

OTHER REFERENCES

Hodgins et al., pp. 512–515, Ind. and Eng. Chem., Apr. 1941.